(12) United States Patent
Kim et al.

(10) Patent No.: US 8,602,480 B2
(45) Date of Patent: Dec. 10, 2013

(54) SUNVISOR HAVING DAMPER DEVICE

(75) Inventors: Yong Bae Kim, Suwon-si (KR); Deok Rae Kim, Ulsan (KR)

(73) Assignees: Hyundai Motor Company, Seoul (KR); KIA Motors Corporation, Seoul (KR); Yong San Co., Ltd., Ulsan (KR)

( * ) Notice: Subject to any disclaimer, the term of this patent is extended or adjusted under 35 U.S.C. 154(b) by 0 days.

(21) Appl. No.: 13/612,304

(22) Filed: Sep. 12, 2012

(65) Prior Publication Data
US 2013/0154303 A1 Jun. 20, 2013

(30) Foreign Application Priority Data
Dec. 15, 2011 (KR) .......................... 10-2011-0135797

(51) Int. Cl.
*B60J 1/02* (2006.01)
(52) U.S. Cl.
USPC ....................................................... 296/97.13
(58) Field of Classification Search
USPC ............ 296/97.4, 97.12, 97.13, 97.9; 403/65, 403/73, 82, 301
See application file for complete search history.

(56) References Cited

U.S. PATENT DOCUMENTS

| | | | | |
|---|---|---|---|---|
| 5,139,303 A | * | 8/1992 | Miller | 296/97.9 |
| 5,556,155 A | * | 9/1996 | Welter | 296/97.12 |
| 5,564,772 A | * | 10/1996 | Miller | 296/97.12 |
| 6,264,264 B1 | * | 7/2001 | Kato et al. | 296/97.12 |
| 2006/0175869 A1 | * | 8/2006 | Torii et al. | 296/187.05 |

FOREIGN PATENT DOCUMENTS

| | | |
|---|---|---|
| JP | 11-157334 A | 6/1999 |
| KR | 10-2007-0060748 A | 6/2007 |
| KR | 20-0442185 Y1 | 10/2008 |

* cited by examiner

Primary Examiner — Lori Lyjak
(74) Attorney, Agent, or Firm — Morgan, Lewis & Bockius LLP

(57) ABSTRACT

A sunvisor apparatus may include a pivot arm fixed to a headlining, a sunvisor portion rotatably installed at an end portion of the pivot arm, and a damper device installed between the pivot arm and the sunvisor portion to reduce a rotating speed of the sunvisor portion through increasing of a frictional force while the end portion of the pivot arm may be inserted into the damper device.

7 Claims, 3 Drawing Sheets

SUNVISOR HAVING DAMPER DEVICE

CROSS-REFERENCE TO RELATED APPLICATION

The present application claims priority to Korean Patent Application No. 10-2011-0135797, filed on Dec. 15, 2011 in the Korean Intellectual Property Office, the entire contents of which is incorporated herein for all purposes by this reference.

BACKGROUND OF THE INVENTION

1. Field of the Invention

The present invention relates generally to a sunvisor, and more particularly, to a sunvisor having a damper device, which can reduce the occurrence of noise through reduction of a rotating speed of the sunvisor.

2. Description of Related Art

In general, a sunvisor is installed on a headlining of a vehicle, and intercepts light incident from outside to ensure a driver's visual field.

Such a sunvisor is rotated around a pivot arm to intercept the light that is directed to a driver or a passenger.

However, when the sunvisor returns, it is strongly rotated in an auto return section, and collides with the headlining to cause the occurrence of a "tung" noise.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sunvisor having a damper device, which can reduce the occurrence of noise through reduction of a rotating speed of the sunvisor using the damper device.

In an aspect of the present invention, a sunvisor apparatus may include a pivot arm fixed to a headlining, a sunvisor portion rotatably installed at an end portion of the pivot arm, and a damper device installed between the pivot arm and the sunvisor portion to reduce a rotating speed of the sunvisor portion through increasing of a frictional force while the end portion of the pivot arm is inserted into the damper device.

The damper device may include a housing fixed to the sunvisor portion and filled with oil, an oil damper rotatably provided inside the housing, and a coupling member rotatably installed inside the housing and having an end to which the end portion of the pivot arm is fixed and the other end thereof which is fixed to the oil damper.

An elastic member elastically supporting the oil damper is provided in a receiving chamber formed inside the housing.

The elastic member elastically supports the oil damper in a longitudinal direction of the housing.

The oil damper may have a frictional projection formed on an outer circumference to turn up the oil while rotating to increase a frictional force between the oil chamber and the housing.

A coupling projection is formed in a radial direction at the end portion of the pivot arm, and is inserted into a coupling groove formed in a radial direction in an insertion groove formed at the end of the coupling member to be coupled to the coupling member.

The oil damper and the coupling member are coupled to each other to interlock with each other.

The pivot arm may include a receiving groove formed in a circumferential direction thereof and the sunvisor portion may include a coupling protrusion in a ring shape to be rotatably coupled to the receiving groove so as to prevent the sunvisor portion from being decoupled from the pivot arm by the elastic member.

According to the present invention as configured above, since the damper device is applied to the sunvisor, the rotating speed of the sunvisor is reduced by the damper device when the sunvisor is rotated, and thus the noise occurrence is reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
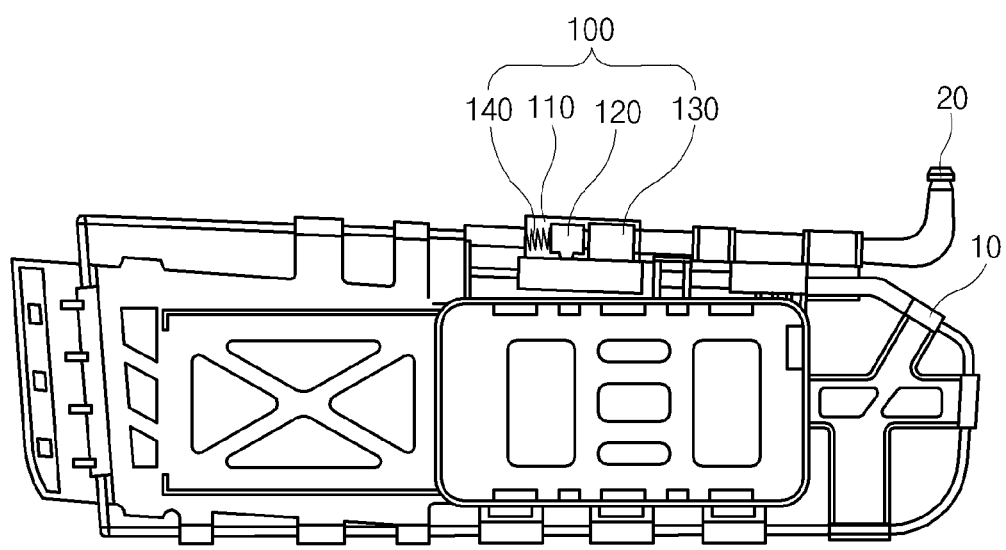
FIG. 1 is a view illustrating a sunvisor having a damper device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A sunvisor having the above-described object and effects according to the present invention may include a pivot arm fixed to a headlining, a sunvisor portion rotatably installed at an end portion of the pivot arm, and a damper device installed on the sunvisor portion to reduce a rotating speed of the sunvisor portion through increasing of a frictional force while the end portion of the pivot arm is inserted into the damper device.

The damper device may include a housing provided on the sunvisor and filled with oil, an oil damper provided inside the housing, and a coupling member having one end to which the end portion of the pivot arm is fixed and the other end that is inserted into the oil damper.

An elastic member elastically supporting the oil damper may be provided inside the damper housing.

The oil damper may have a frictional projection formed on one side thereof to increase a frictional force.

A coupling projection may be formed at the end portion of the pivot arm, and may be inserted into a coupling groove formed in an insertion groove of the coupling member to be coupled to the coupling member.

The oil damper and the coupling member may be coupled to each other to interlock with each other.

Hereinafter, an exemplary embodiment of the present invention will be described with reference to the accompanying drawing. The matters defined in the description, such as the detailed construction and elements, are nothing but specific details provided to assist those of ordinary skill in the art in a comprehensive understanding of the invention, and thus the present invention is not limited thereto. In the drawings, portions that do not relate to the description of the present invention are omitted. In the entire description of the present invention, the similar drawing reference numerals are used for the similar elements across various figures.

A sunvisor according to an exemplary embodiment of the present invention is configured to reduce the rotating speed of a sunvisor 10 that is rotated around a pivot arm 20 using a damper device 100 so as to prevent the occurrence of a "tung" noise.

Figure 2:
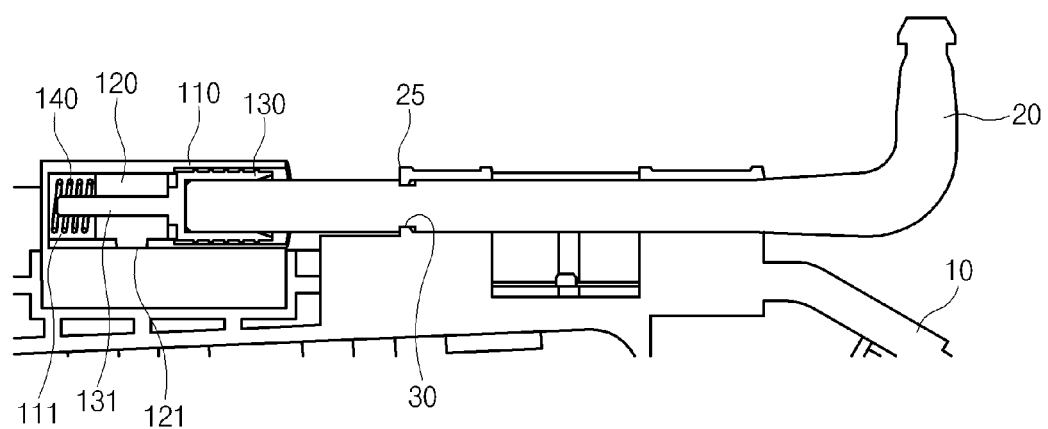
FIG. 2 is a cross-sectional view illustrating a sunvisor having a damper device according to an exemplary embodiment of the present invention.
Figure 3:
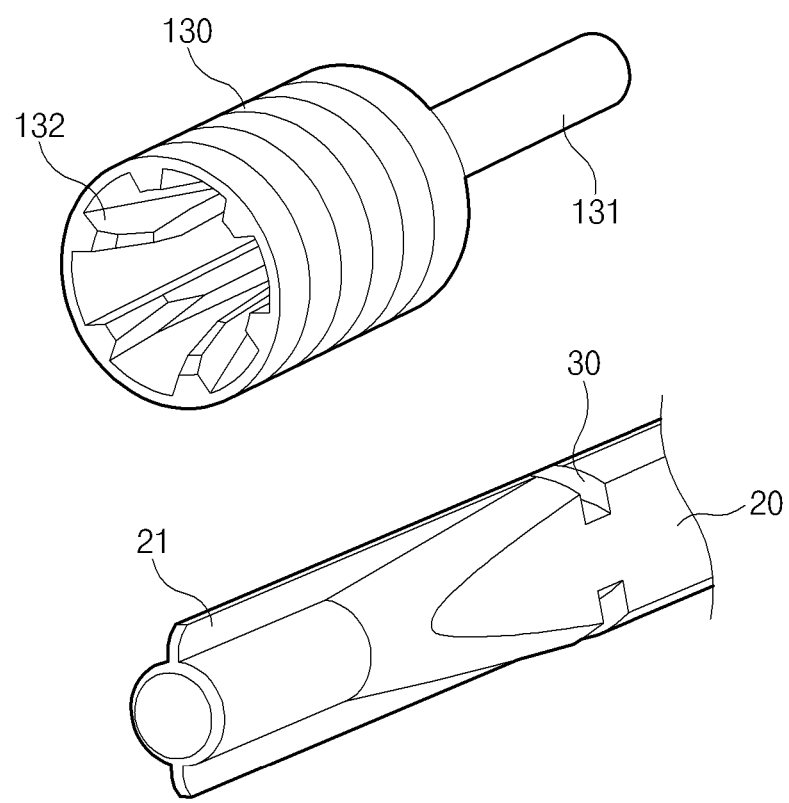
FIG. 3 is a perspective view illustrating a coupling structure between a coupling member and a pivot arm of a sunvisor having a damper device according to an exemplary embodiment of the present invention.

As illustrated in FIGS. 1 and 2, the sunvisor according to an exemplary embodiment of the present invention includes the pivot arm 20 fixed to the headlining, the sunvisor portion 10 rotatably installed at an end portion of the pivot arm 20, and the damper device 100 installed on the sunvisor portion 10 to reduce the rotating speed of the sunvisor portion 10 through increasing of the frictional force while the end portion of the pivot arm 20 is inserted into the damper device 100.

The damper device 100 includes a housing 110 provided on one side of an upper portion of the sunvisor 10 on which the end portion of the pivot arm 20 is positioned and filled with oil, an oil damper 120 provided inside the housing 110 to generate a frictional force due to friction with the oil when the oil damper 120 is rotated, a coupling member 130 having one end to which the end portion of the pivot arm 20 is fixed and the other end that is inserted into the oil damper 120, and an elastic member 140 provided in a receiving chamber 111 formed inside the housing 110 to elastically support the oil damper 120.

Here, the oil damper has a frictional projection 121 formed on one side thereof. When the oil damper is rotated, the frictional projection 121 is rotate to turn up the oil to increase the frictional force, and thus the rotating speed of the sunvisor 10 is further reduced.

Further, the end portion of the pivot arm 20 is inserted into the coupling member 130 to be coupled to the coupling member 130. That is, a coupling projection 21 is formed at the end portion of the pivot arm 20, and the coupling projection 21 is inserted into a coupling groove 132 formed in an insertion groove of the coupling member 130 to be coupled to the coupling member 130.

Further, the oil damper 120 and the coupling member 130 are coupled to each other to interlock with each other. That is, an extension portion 131 formed at one end of the coupling member 130 is inserted to penetrate the center of the oil damper 120, and is coupled to the oil damper 120 to interlock with the oil damper 120.

According to the sunvisor having the damper device as configured above according to an exemplary embodiment of the present invention, if the sunvisor 10 is rotated in the headlining direction around the pivot arm 20, the housing 110 is rotated in interlocking with the sunvisor 10. At this time, due to the friction between the oil that fills in the housing 110 and the oil damper 120, the rotating speed of the housing 110 is reduced to cause the rotating speed of the sunvisor 10 also to be reduced, and the sunvisor is in close contact with the headlining in a speed reduced state to prevent the noise occurrence.

In an exemplary embodiment of the present invention, the pivot arm 20 may include a receiving groove 30 formed in a circumferential direction thereof and the sunvisor portion 10 may include a coupling protrusion 25 in a ring shape to be rotatably coupled to the receiving groove 30 so as to prevent the sunvisor portion 10 from being decoupled from the pivot arm 20 by the elastic member 140.

Although preferred embodiments of the present invention have been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sunvisor apparatus comprising:
   a pivot arm fixed to a headlining;
   a sunvisor portion rotatably installed at an end portion of the pivot arm; and
   a damper device installed between the pivot arm and the sunvisor portion to reduce a rotating speed of the sunvisor portion through increasing of a frictional force while the end portion of the pivot arm is inserted into the damper device;
   wherein the damper device includes:
      a housing fixed to the sunvisor portion and filled with oil;
      an oil damper rotatably provided inside the housing; and
      a coupling member rotatably installed inside the housing and having an end to which the end portion of the pivot arm is fixed and the other end thereof which is fixed to the oil damper.

2. The sunvisor apparatus according to claim 1, wherein an elastic member elastically supporting the oil damper is provided in a receiving chamber formed inside the housing.

3. The sunvisor apparatus according to claim 2, wherein the elastic member elastically supports the oil damper in a longitudinal direction of the housing.

4. The sunvisor apparatus according to claim 1, wherein the oil damper has a frictional projection formed on an outer circumference to turn up the oil while rotating to increase a frictional force between the oil damper and the housing.

5. The sunvisor apparatus according to claim 1, wherein a coupling projection is formed in a radial direction at the end portion of the pivot arm, and is inserted into a coupling groove formed in a radial direction in an insertion groove formed at the end of the coupling member to be coupled to the coupling member.

6. The sunvisor apparatus according to claim 1, wherein the oil damper and the coupling member are coupled to each other to interlock with each other.

7. The sunvisor apparatus according to claim 1, wherein the pivot arm include a receiving groove formed in a circumferential direction thereof and the sunvisor portion includes a coupling protrusion in a ring shape to be rotatably coupled to the receiving groove so as to prevent the sunvisor portion from being decoupled from the pivot arm by the elastic member.

* * * * *